(12) United States Patent
Leland et al.

(10) Patent No.: US 7,690,595 B2
(45) Date of Patent: Apr. 6, 2010

(54) SYSTEM, METHOD, AND APPARATUS FOR THROAT CORNER SCOOP OFFTAKE FOR MIXED COMPRESSION INLETS ON AIRCRAFT ENGINES

(75) Inventors: Bradley C. Leland, Burleson, TX (US); Brian F. Lundy, Arlington, TX (US); John D. Klinge, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 301 days.

(21) Appl. No.: 11/637,644

(22) Filed: Dec. 12, 2006

(65) Prior Publication Data

US 2010/0051756 A1 Mar. 4, 2010

(51) Int. Cl.
*B64D 33/02* (2006.01)
(52) U.S. Cl. .................................. 244/53 B; 137/15.1
(58) Field of Classification Search ............... 244/53 B, 244/53 R, 53 A; 60/336, 782, 785, 795; 137/15.1, 137/15.2
See application file for complete search history.

(56) References Cited

U.S. PATENT DOCUMENTS

| | | | | | |
|---|---|---|---|---|---|
| 2,990,142 | A | * | 6/1961 | Ferri | 244/53 B |
| 3,066,892 | A | * | 12/1962 | Smith et al. | 244/53 B |
| 3,543,877 | A | | 12/1970 | Ranvier et al. | |
| 3,578,265 | A | * | 5/1971 | Patierno et al. | 244/198 |
| 3,643,676 | A | * | 2/1972 | Limage et al. | 137/15.2 |
| 3,990,530 | A | | 11/1976 | Helfrich et al. | |
| 4,463,772 | A | * | 8/1984 | Ball | 137/15.2 |
| 4,474,001 | A | | 10/1984 | Griffin et al. | |
| 4,655,413 | A | * | 4/1987 | Genssler et al. | 244/53 B |
| 5,044,153 | A | | 9/1991 | Mouton | |
| 5,114,097 | A | * | 5/1992 | Williams | 244/119 |
| 5,269,135 | A | | 12/1993 | Vermejan et al. | |
| 5,490,644 | A | * | 2/1996 | Koncsek et al. | 244/53 B |
| 5,517,865 | A | | 5/1996 | Wisler et al. | |
| 5,779,196 | A | * | 7/1998 | Timar | 244/209 |
| 5,826,424 | A | | 10/1998 | Klees | |
| 5,826,794 | A | | 10/1998 | Rudolph | |
| 5,881,758 | A | * | 3/1999 | Koncsek et al. | 137/15.2 |
| 5,967,461 | A | * | 10/1999 | Farrington | 244/118.5 |
| 6,793,175 | B1 | * | 9/2004 | Sanders et al. | 244/53 B |
| 6,901,737 | B2 | * | 6/2005 | Schnoor | 60/39.83 |
| 7,048,229 | B2 | * | 5/2006 | Sanders et al. | 244/53 B |
| 2004/0251378 | A1 | * | 12/2004 | Bagnall | 244/53 B |
| 2006/0016932 | A1 | * | 1/2006 | Bagnall | 244/53 B |
| 2006/0102779 | A1 | * | 5/2006 | Campbell et al. | 244/53 B |
| 2006/0156735 | A1 | | 7/2006 | Laster et al. | |
| 2008/0099630 | A1 | * | 5/2008 | Parikh et al. | 244/53 B |
| 2008/0135689 | A1 | * | 6/2008 | Parikh et al. | 244/53 B |

FOREIGN PATENT DOCUMENTS

GB 2340890 A 3/2000

* cited by examiner

*Primary Examiner*—Michael R Mansen
*Assistant Examiner*—Brian M O'Hara
(74) *Attorney, Agent, or Firm*—Bracewell & Giuliani LLP

(57) ABSTRACT

A system, method, and apparatus for throat corner scoop offtake for mixed compression inlets for high speed aircraft engine applications is disclosed. The throat corner scoops are small air intakes located inside the large mixed compression inlet. They are positioned in a region otherwise prone to generate low pressure airflow. The throat corner scoops capture and remove the low pressure airflow from the bulk stream that is passed on to the engine. This location also provides inlet stability enhancement, and the airflow is used on the auxiliary systems.

13 Claims, 3 Drawing Sheets

SYSTEM, METHOD, AND APPARATUS FOR THROAT CORNER SCOOP OFFTAKE FOR MIXED COMPRESSION INLETS ON AIRCRAFT ENGINES

BACKGROUND OF THE INVENTION

1. Technical Field

The present invention relates in general to inlet design for aircraft engines and, in particular, to an improved system, method, and apparatus for throat corner scoop offtake for mixed compression inlets for high speed aircraft engine applications.

2. Description of the Related Art

Air inlet systems for gas turbine powered supersonic aircraft are required to decelerate the approaching flow to subsonic conditions before it reaches the engine face. Supersonically, this can be done through shock waves or isentropic compression generated externally, internally, or by a mixture of both. Fixed geometry external compression inlets have typically been used for aircraft (e.g., the F-16 and F-18) designed for short excursions to supersonic conditions, due to the relative simplicity and light weight of these designs. Aircraft capable of higher speeds, such as the F-14 and F-15, have employed variable geometry external compression inlets to obtain better engine and inlet airflow matching at low speeds, and higher performance at supersonic speeds.

High altitude supersonic cruise aircraft typically require maximum efficiency at the cruise point to obtain optimum range and payload. At speeds above Mach 2, mixed compression inlet systems become favorable over external compression systems due to reduced drag. Mixed compression inlets have been demonstrated in flight on aircraft such as the A-12, SR-71, D-21, and XB-70. Several other designs have been tested over the past 50 years. All of these mixed compression designs were based on either axi-symmetric or two-dimensional compression schemes in order to minimize shock interactions caused by complex, three-dimensional geometry.

As shown in FIG. 1, axi-symmetric mixed compression inlet designs 11 typically include a throat bleed system that removes the low pressure boundary layer from the main duct 13. This provides terminal normal shock stability and reduces shock/boundary layer interaction, which reduces overall pressure recovery and increases distortion. In this example, the throat bleed system includes both a centerbody shock trap 15 and a cowl slot 17. The low energy air captured in the shock trap 15 would likely be exhausted overboard as it typically does not have enough energy to be used as utility flow. Having more energy due to a larger dynamic pressure component, the cowl slot 17 could possibly be used for utility flow. Various approaches to these bleed systems have been implemented in the industry for axi-symmetric and two-dimensional mixed compression inlets. Increasing demand for more integrated inlet and airframe concepts has resulted in the need for more exotic inlet aperture shapes. These exotic shapes impose additional geometric constraints that require novel approaches to bleed system design and integration.

Exotically-shaped, high speed engine inlets can suffer from several diverse performance losses. First, mixed compression inlets with duct wall interfaces that form acute angles (such as streamline traced inlets) can develop vorticity and a thick boundary layer (e.g., corner flow) in these regions which can cause separation and flowfield distortion that reduces engine performance. Second, a mixed compression inlet can undergo a process called "unstart" in which terminal shock stability is lost and airflow to the engine is drastically reduced, which consequently reduces engine performance. Third, airflow from the engine inlet is required for nacelle ventilation, environmental control systems, and various other utility and subsystems. While current state-of-the-art bleed system designs and integration approaches are workable for axi-symmetric and two-dimensional mixed compression inlets, an improved solution would be desirable for advanced shaped mixed compression inlet concepts that impose additional requirements based on geometrical constraints.

SUMMARY OF THE INVENTION

One embodiment of a system, method, and apparatus for an inlet throat bleed system for exotically-shaped mixed compression inlets comprises a throat corner scoop offtake. The invention addresses all three problems described above in the background. Throat corner scoops are small air intakes located inside the large mixed compression inlet. They are positioned in a region otherwise prone to generate low pressure airflow. The throat scoops capture and remove the low pressure airflow from the bulk stream that is passed on to the engine. This location also provides inlet stability enhancement, and the airflow is used on the auxiliary systems.

Mixed compression inlets traditionally have been designed as axi-symmetric or two-dimensional configurations. Such designs typically include a throat bleed system that removes the low pressure boundary layer from the main duct via a shock trap or bleed holes and slots, which are designed to remove boundary layer and provide terminal shock stability. The throat corner scoops of the present invention are designed to do this for non-axi-symmetric mixed compression inlet configurations such as, for example, advanced diverterless streamline-traced inlets. In contrast to current and future architectures, the previous designs did not have acute corners and therefore did not need to address the issue of corner flow affecting engine operation. Thus, the present solution has the added advantage of enhancing the viability of advanced streamline traced mixed compression inlets.

For example, the corner throat scoop is well suited for advanced streamline traced mixed compression inlets that incorporate acute corners and angles into the forward diffuser geometry. The scoop walls allow for a favorable aerodynamic transition as the main duct flow passes through a streamline-traced forward diffuser and moves toward a circular engine face or a bifurcated dual engine configuration. The invention also addresses several diverse design issues with a single solution.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
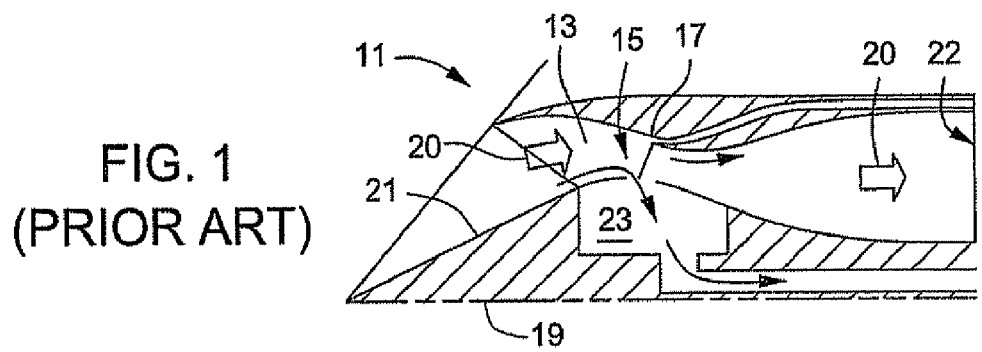
FIG. 1 is a half-sectional side view of a conventional, axi-symmetric aircraft engine inlet equipped with a conventional shock trap and cowl slot.
Figure 2:
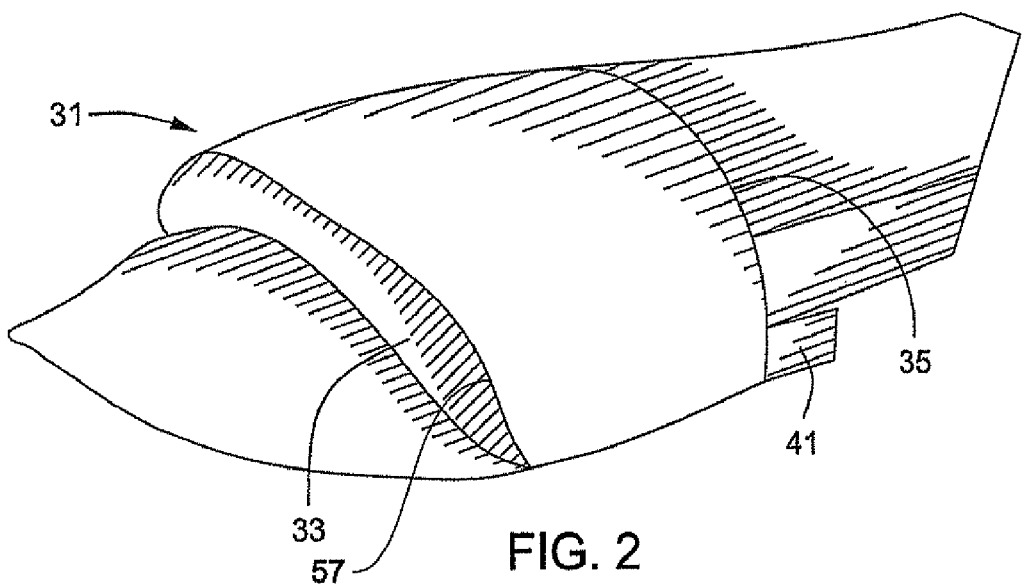
FIG. 2 is an isometric view of one embodiment of non-axi-symmetric, aircraft engine inlet constructed in accordance with the present invention.
Figure 3:
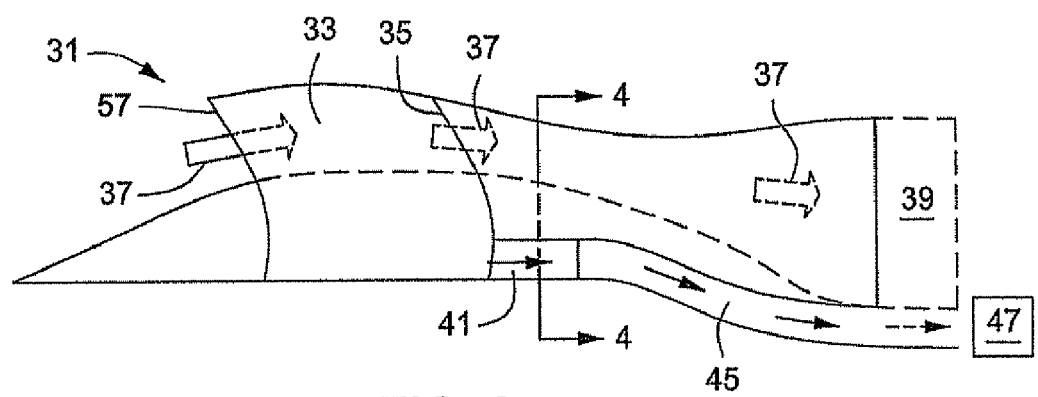
FIG. 3 is a schematic side view of the inlet of FIG. 2 and is constructed in accordance with the present invention.
Figure 4:
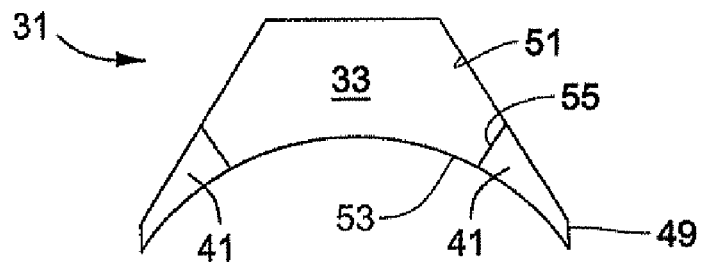
FIG. 4 is a sectional end view of one embodiment of the inlet of FIG. 2 taken along the line 4-4 of FIG. 3 and is constructed in accordance with the present invention.

Referring to FIGS. 2-7, embodiments of a system, method and apparatus for manipulating airflow into a high speed aircraft engine is disclosed. As shown in FIGS. 2-4, one embodiment of the invention comprises a non-axi-symmetric, mixed compression inlet 31. The mixed compression inlet 31 comprises a forward supersonic diffuser 33, a minimum area throat region or throat 35, and a subsonic diffuser section downstream of the throat 35 to provide subsonic airflow to a high speed aircraft engine 39. The airflow 37 (FIG. 3) is captured by the inlet 31, compressed in the supersonic section 33 to the terminal normal shock just downstream of the throat 35, and is further decelerated in the subsonic diffuser to the desired Mach number at the engine 39. The engine 39 may be a single engine or may be bifurcated to feed multiple engines.

Figure 6:
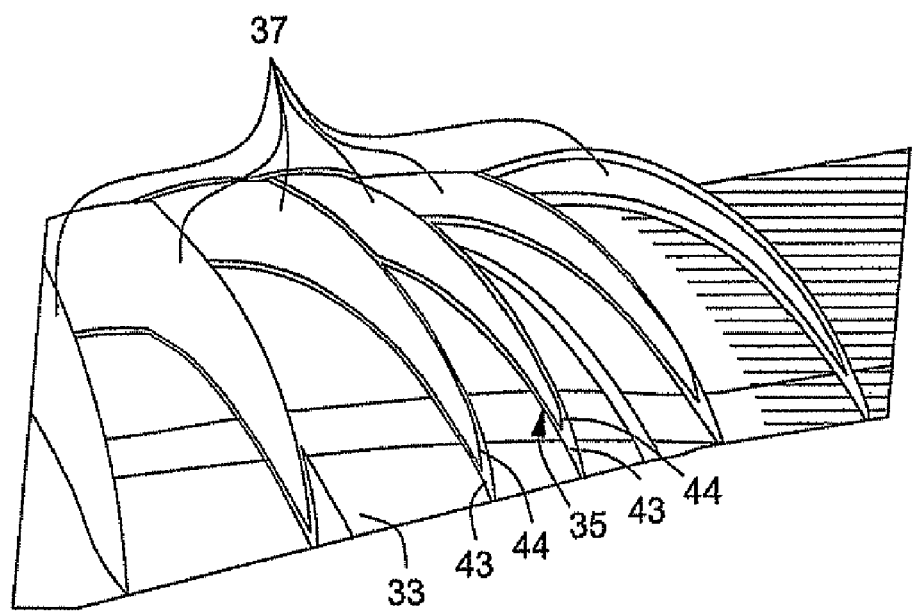
FIG. 6 is an isometric view of an interior of the inlet of FIG. 2 showing sectional images of air flow therethrough without the improvement of the present invention.

A small air intake or scoop 41 is located inside the mixed compression inlet 31. In one embodiment, the scoop 41 is a throat corner scoop 41 that protrudes into an interior volume region of the mixed compression inlet 31 that is prone to generate a boundary layer of low pressure airflow 43 (FIG. 6) as a component of the bulk airflow stream 37. For ease of reference, only "sections" of the airflow 37 are illustrated in FIG. 6, including general gradations between high pressure flow 44 and low pressure flow 43. The low pressure airflow 43 results from the acute angle formed by the shape of the supersonic diffuser 33. The scoop 41 is not flush with the interior surfaces of the mixed compression inlet 31, and it is isolated in location rather than integrated into the perimeter or circumferential geometry of the mixed compression inlet 31.

The throat corner scoop 41 captures and removes the low pressure airflow 43 from the bulk airflow stream 37. The throat corner scoop 41 also provides inlet shock stability enhancement by inherently increasing the rate of airflow as the normal shock moves forward of the scoop in the event of an imminent unstart. In addition, the throat corner scoop provides a source of additional airflow via duct 45 and the like for an auxiliary system 47 of the aircraft, such as secondary ventilation (e.g., nacelle ventilation), cooling, and/or airflow for the environmental control system (ECS), i.e., air conditioning for the pilot, avionics, and other temperature sensitive equipment.

Figure 5:
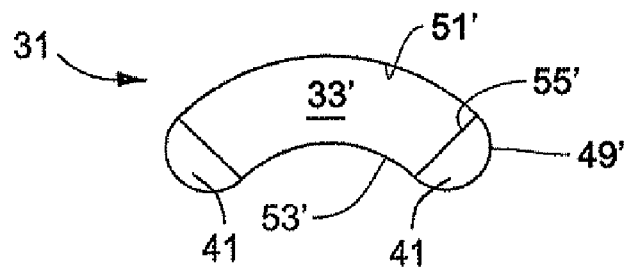
FIG. 5 is a sectional end view of another embodiment of the inlet of FIG. 2 taken along the line 4-4 of FIG. 3 and is constructed in accordance with the present invention.

In one embodiment, the mixed compression inlet 31 comprises a geometry that includes acute corners 49 (see, e.g., FIG. 4) that can create voracity and accumulate boundary layer. Subsonic diffuser 33 has an upper wall 51 and a lower wall 53 that converge toward each other as they approach each corner 49. An inboard or sidewall 55 joins upper and lower walls 51, 53 inboard from each corner 49. In the embodiments shown, the throat corner scoops 41 are located in at least one of the acute corners (two shown). The acute corners may be located at the throat 35 of the forward supersonic diffuser 33 of the mixed compression inlet 31. The throat corner scoop 41 allows for a favorable aerodynamic transition as the bulk airflow stream 37 passes through the throat 35 of the forward diffuser 33. The arrangement in FIG. 5 is similar to FIG. 4, but corners 49' are rounded. Upper and lower walls 51', 53' of subsonic diffuser 33' are joined by sidewalls 55' to define scoops 41'.

As shown in the illustrated embodiments, the throat corner scoop 41 comprises a plurality of discrete throat corner scoops, each of which is located in a low pressure airflow region inside the mixed compression inlet. A leading edge of the throat corner scoop 41 may be located at the throat 35. The scoop 41 may comprise a small air intake located inside the mixed compression inlet and positioned in a region prone to generate low pressure airflow as a component of the bulk airflow stream, such that the scoop captures and removing the low pressure airflow from the bulk airflow stream. In FIG. 2, an aperture 57 for subsonic diffuser 33 is the farthest upstream location where subsonic diffuser 33 first completely surrounds and constrains the main bulk air flow. The air intake to scoop 41 is a considerable distance rearward from aperture 57.

Figure 7:
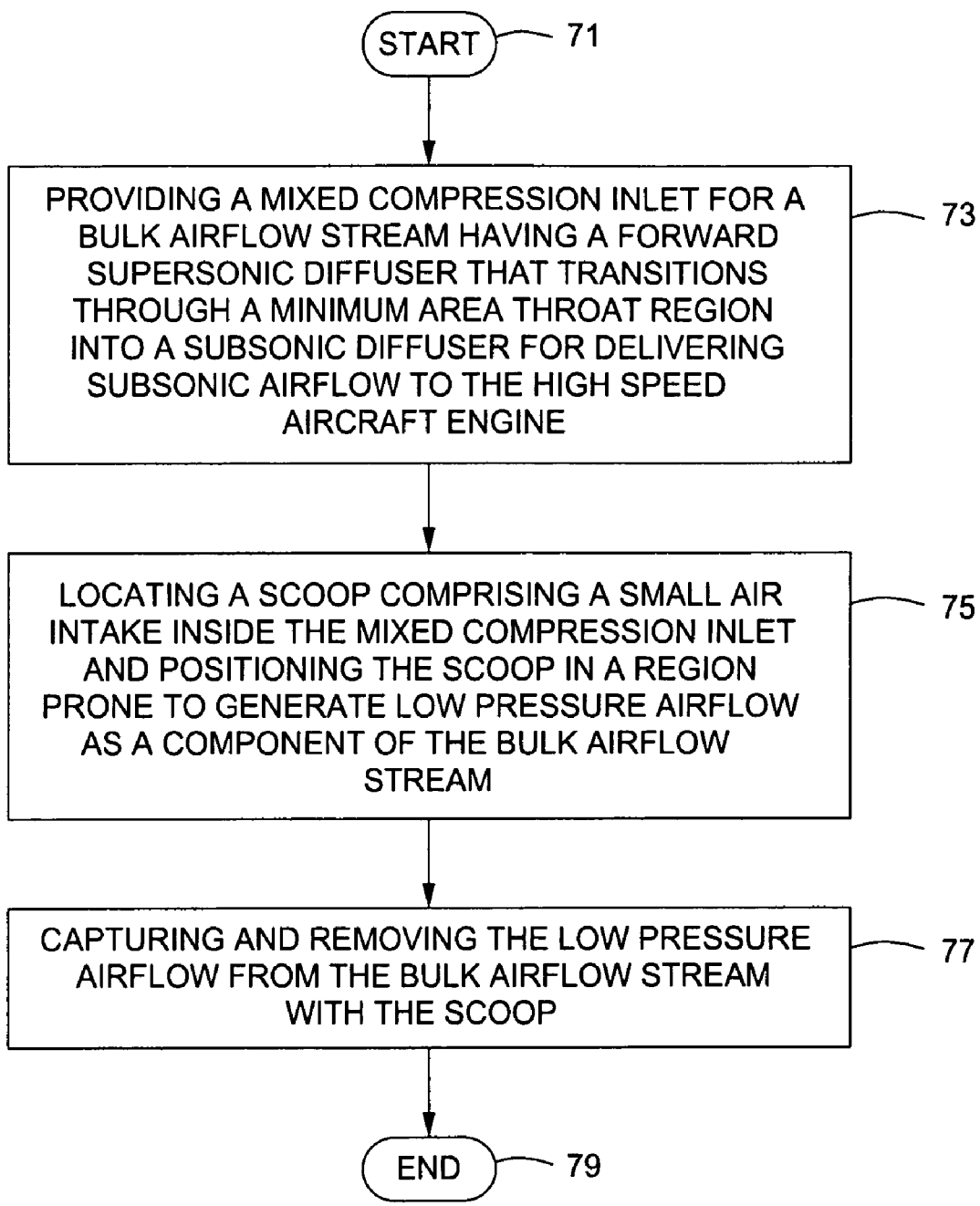
FIG. 7 is a high level flow diagram of one embodiment of method constructed in accordance with the present invention.

Referring now to FIG. 7, one embodiment of a method of manipulating airflow for a high speed aircraft engine is disclosed. The method begins as indicated at step 71, and comprises providing a mixed compression inlet for a bulk airflow stream having a forward supersonic diffuser that transitions through a minimum area throat region into a subsonic diffuser for delivering subsonic airflow to the high speed aircraft engine (step 73); locating a scoop comprising a small air intake inside the mixed compression inlet and positioning the scoop in a region prone to generate low pressure airflow as a component of the bulk airflow stream (step 75); capturing and removing the low pressure airflow from the bulk airflow stream with the scoop (step 77); before ending as indicated at step 79.

In other embodiments, the method may comprise providing inlet stability enhancement and a source of additional airflow for an auxiliary system selected from the group consisting of nacelle ventilation and an environmental control system. The method also may comprise providing the mixed compression inlet as a non-axi-symmetric design comprising a geometry that includes at least one corner formed at an acute angle, and the scoop is located in that acute angled corner.

The invention has many advantages, including providing boundary layer removal for shock and boundary layer interaction reduction, which is important for all high speed inlets. It also provides mixed compression stability margin for mixed compression inlets. In addition, the invention provides a high pressure source for utility flow needs, which is important for highly integrated inlet systems. Furthermore, this design removes the corner vortex that enables the viability of the streamline traced inlet for advanced inlets. All of these advantages are provided simultaneously with a single device.

While the invention has been shown or described in only some of its forms, it should be apparent to those skilled in the art that it is not so limited, but is susceptible to various changes without departing from the scope of the invention.

What is claimed is:

1. A system for manipulating airflow for a high speed aircraft engine, comprising:

a non-axi-symmetric, mixed compression inlet for a bulk airflow stream having a forward supersonic diffuser that receives a bulk airflow stream and transitions rearwardly through a minimum area throat region into a subsonic diffuser to provide subsonic airflow to a high speed aircraft engine;

a scoop having a small air intake located inside the supersonic diffuser of the mixed compression inlet and positioned in a region prone to generate low pressure airflow as a component of the bulk airflow stream, the scoop capturing and removing the low pressure airflow from the bulk airflow stream;

wherein the air intake of the scoop is located in the throat region rearwardly of where the supersonic diffuser first completely surrounds and confines the bulk airflow stream;

and wherein the mixed compression inlet comprises a geometry that includes at least one corner defined by an upper wall and a lower wall that are joined at the corner, and the scoop is located in the corner and is defined by the side wall, which joins the upper and lower walls at a point laterally inboard from the corner relative to the bulk airflow stream.

2. A system according to claim 1, wherein the scoop provides inlet stability enhancement and a source of additional airflow for an auxiliary system.

3. A system according to claim 2, wherein the auxiliary system is one of nacelle ventilation and an environmental control system.

4. A system according to claim 1, wherein the acute corner comprises a pair of corners located at opposite outboard sides of the mixed compression inlet, and the scoop comprises a pair of scoops, each of which is located in one of the acute corners.

5. A system according to claim 1, wherein the mixed compression inlet comprises a geometry that includes at least one acute corner defined by an upper wall and a lower wall that slope toward each other in a lateral outward direction and are joined at the acute corner, and the scoop is located in the acute corner and is defined by the side wall, which joins the upper and lower walls at a point laterally inboard from the acute corner relative to the bulk airflow stream.

6. A system according to claim 1, wherein the scoop comprises a plurality of discrete scoops, each of which is located in a low pressure airflow region inside the mixed compression inlet, each of which has an air intake located in a vicinity of the throat region and has a side wall that separates the low pressure airflow within the scoop from the bulk airflow stream in the supersonic diffuser.

7. A mixed compression inlet for a high speed aircraft engine, the mixed compression inlet being non-axi-symmetric, comprising:

a forward supersonic diffuser that transitions through a minimum area throat region into a subsonic diffuser to provide to the aircraft engine subsonic airflow from a bulk airflow stream flowing through the mixed compression inlet;

the mixed compression inlet having opposite outboard corners that join upper and lower walls of the mixed compression inlet;

two throat corner scoops, each comprising a small air intake located inside the supersonic diffuser in the throat region at each of the corners, each air intake being located rearward from a most upstream point where the supersonic diffuser first completely surrounds and confines the bulk airflow stream, each throat corner scoop having an inboard wall spaced inboard from one of the corners and joining the upper and lower walls, each of the throat corner scoops capturing and removing low pressure airflow from the bulk airflow stream flowing through the mixed compression inlet that is passed on to the high speed aircraft engine, such that each of the throat corner scoops provides inlet stability enhancement and a source of additional airflow for at least one auxiliary system; and the inboard walls of the throat corner scoops separate the low pressure airflow within the throat corner scoops from the bulk airflow stream.

8. A mixed compression inlet according to claim 7, wherein the at least one auxiliary system is one of nacelle ventilation and an environmental control system.

9. A mixed compression inlet according to claim 7, wherein the upper and lower walls at each of the corners slope toward each other in an outboard direction, defining an acute configuration for each of the corners.

10. A method of manipulating airflow for a high speed aircraft engine, comprising:

(a) providing a non-axi-symmetric, mixed compression inlet for a bulk airflow stream having a forward supersonic diffuser that transitions through a minimum area throat region into a subsonic diffuser for delivering subsonic airflow to the high speed aircraft engine, the supersonic diffuser having an upstream location where it first surrounds and confines the bulk airflow stream;

(b) locating a scoop comprising a small air intake inside the mixed compression inlet downstream from the upstream location and within the throat region, and positioning the scoop in a region prone to generate low pressure airflow as a component of the bulk airflow stream;

(c) capturing and removing the low pressure airflow from the bulk airflow stream with the scoop; and wherein step (a) comprises providing the mixed compression inlet with a geometry that includes at least one corner defined by upper and lower walls that join each other, and the scoop is located in the corner and is defined by an inboard side wall that joins the upper and lower walls at a point laterally inboard from the corner, the inboard side wall separating the low pressure airflow within the scoop from the bulk airflow stream within the mixed compression inlet.

11. A method according to claim 10, wherein step (c) comprises providing with the scoop inlet stability enhancement and a source of additional airflow for an auxiliary system selected from the group consisting of nacelle ventilation and an environmental control system.

12. A method according to claim 10, wherein the corner comprises a pair of corners located in the mixed compression inlet and on opposite outboard sides of the mixed compression inlet, and the scoop comprises a pair of scoops, each of which is located in one of the corners.

13. A method according to claim 10, wherein step (a) comprises providing the mixed compression inlet with a geometry that includes at least one acute corner defined by upper and lower walls that slope toward and join each other, and the scoop is located in the acute corner and is defined by an inboard wall that joins the upper and lower walls at a point laterally inboard from the acute corner.

* * * * *